United States Patent [19]

daSilva

[11] 4,270,550

[45] Jun. 2, 1981

[54] COMBINE HARVESTER

[76] Inventor: Josè T. daSilva, 1354 D. Luiz do Amaral Moushinho St., Ribeirao Preto, Sao Paulo, Brazil

[21] Appl. No.: 15,606

[22] Filed: Feb. 23, 1979

Related U.S. Application Data

[63] Continuation-in-part of Ser. No. 839,612, Oct. 5, 1977, abandoned.

[30] Foreign Application Priority Data

Oct. 5, 1976 [BR] Brazil .................................. 7606713

[51] Int. Cl.³ ............................................ A01F 12/18
[52] U.S. Cl. .................... 130/27 T; 56/14.6; 56/16.6
[58] Field of Search .............. 56/14.6, 16.5; 130/27 T, 27 R

[56] References Cited

U.S. PATENT DOCUMENTS

| | | | |
|---|---|---|---|
| 1,575,605 | 3/1926 | Clapp | 56/16.6 |
| 1,932,714 | 10/1933 | Thoen | 56/14.6 |
| 2,212,465 | 8/1940 | Baldwin | 56/14.6 |
| 2,491,232 | 12/1949 | Turnbull | 56/16.6 |
| 2,848,858 | 8/1958 | Kepkay et al. | 56/16.6 |
| 3,439,683 | 4/1969 | Keller | 130/27 T |
| 3,534,742 | 10/1970 | Knapp | 56/14.6 |
| 4,075,823 | 2/1978 | Rowland-Hill | 56/14.6 |

*Primary Examiner*—Jay N. Eskovitz
*Attorney, Agent, or Firm*—Robert E. Burns; Emmanuel J. Lobato; Bruce L. Adams

[57] ABSTRACT

A mobile combine harvester comprises a reaping assembly comprising a laterally extending platform, a cutter bar at the forward edge of the platform, a reel above the cutter bar and a screw conveyor for transporting cut grain to a discharge point. A thrashing assembly which is inclined upwardly rearwardly receives cut grain directly from the reaping assembly and comprises a cylindrical casing, a cylindrical screen in the casing and a rotor in the cylindrical screen. The rotor comprises a cylindrical portion provided with a helically extending vane carrying pins or blades for thrashing the grain. At the rear end of the rotor there is a coaxial radial fan which discharges straw from which grain has been recovered. Below the cylindrical screen there is a grain-collecting trough with a screw conveyor for transporting the grain to the rear where it is delivered directly to a cleaning assembly comprising a vibrating screen and blower for removing light waste. From the cleaning assembly the grain is raised by an elevator and transported by a screw conveyor to a bagging station where the grain is alternatively delivered to two bags.

10 Claims, 4 Drawing Figures

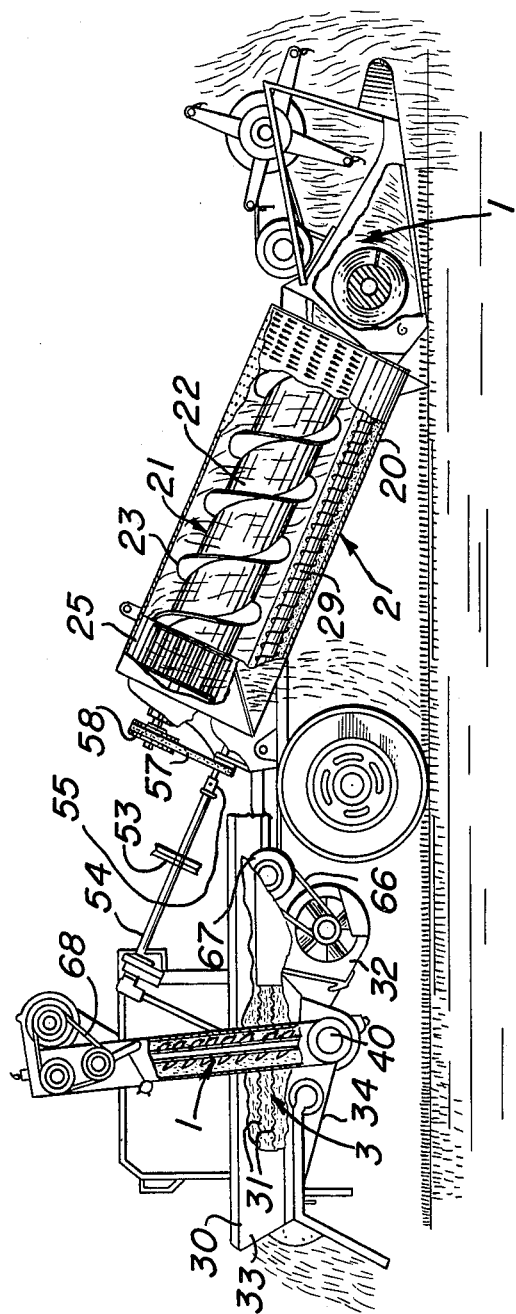
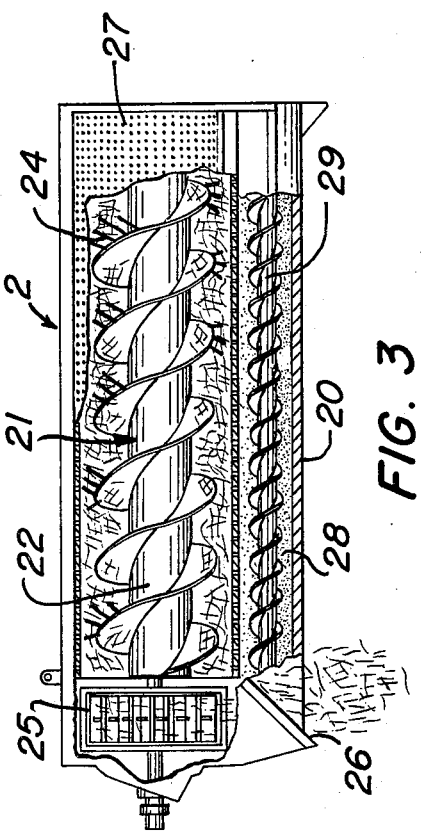

COMBINE HARVESTER

REFERENCE TO PRIOR APPLICATION

This application is a continuation-in-part of application Ser. No. 839,612 filed Oct. 5, 1977 and now abandoned.

FIELD OF INVENTION

The present invention relates to a mobile combine harvester in particular for harvesting grains such as wheat, oats, barley, rye, etc.

BACKGROUND OF THE INVENTION

For many years combines have been used in harvesting grain crops such as wheat, oats, barley and rye. A combine has means for cutting the grain and thereupon thrashing it to separate the grain kernels from the straw and chaff. The straw and chaff are usually scattered back onto the field while the grain is bagged, stored in a container or delivered into a truck which is driven alongside the combine.

By reason of the multiple functions it performs, a combine is a large and expensive piece of equipment. While in some cases a combine is pulled by a tractor, it is frequently self-propelled with the result that the weight and cost of the combine is further increased.

SUMMARY OF THE INVENTION

It is an object of the present invention to provide a mobile combine harvester which is highly effective and efficient but is simpler and less costly than the combines heretofore available.

In accordance with the invention a mobile combine harvester comprises a reaping assembly comprising a laterally extending platform with a cutter bar at the forward edge of the platform, a reel above the cutter bar and a screw conveyor for transporting the cut grain to a discharge point. A thrashing assembly receives the cut grain directly from the reaping assembly and comprises a cylindrical casing which is inclined upwardly and rearwardly with a forward lower end connected with the reaping assembly and a rear end that is elevated. In the casing there is a cylindrical screen in which a rotor is rotatable. The rotor has an elongate cylindrical portion provided with a helically extending vane carrying projecting pins or blades which perform a thrashing operation. At the rear end of the helicoidal portion there is a radial fan which draws air rearwardly through the casing and discharges it with straw from the grain has been separated. Grain separated from the straw passes through the cylindrical screen and is collected in a longitudinal extending trough portion of the casing in which there is provided a screw conveyor for transporting the grain to the rear end of the casing where it is delivered directly to a cleaning assembly comprising a reciprocating screen and a second radial fan for blowing air up through the screen to carry off chaff or other light waste. The cleaned grain is collected in a pan below the screen and delivered to the lower end of an elevator which lifts the grain to a transverse conveyor for transporting it to a bagging station. The conveyor has two discharge spouts so that the grain can be delivered to one bag while a filled bag is removed and replaced by an empty bag.

The combine is adapted to be coupled to a tractor having a power take-off for driving the several operating elements of the combine. The tractor is coupled to a rearward portion of the combine behind the reaping assembly so that it does not mash down grain before it is cut.

BRIEF DESCRIPTION OF DRAWINGS

The nature, objects and advantages of the invention will be more fully understood from the following description of a preferred embodiment of the invention shown by way of example in the accompanying drawings in which:

FIG. 2 is a side elevation with portions broken away to show internal construction;

FIG. 3 is a longitudinal section of the thrashing assembly; and

DESCRIPTION OF PREFERRED EMBODIMENT

Figure 1:
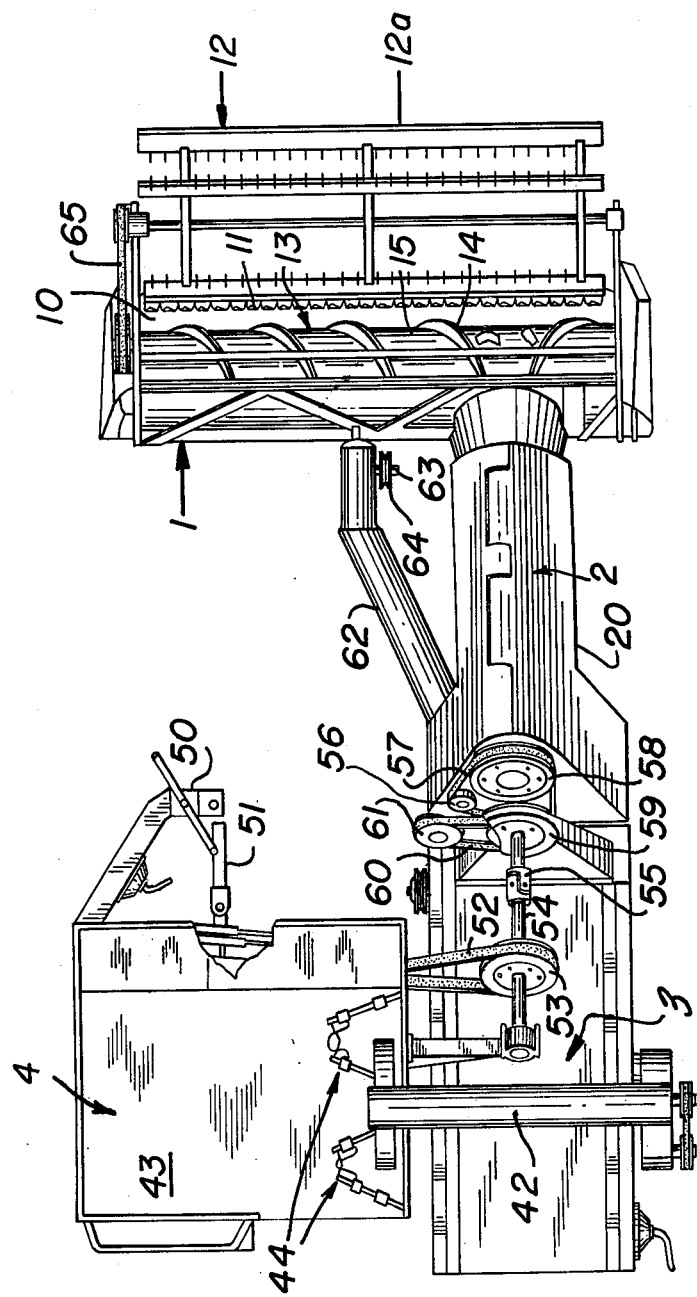
FIG. 1 is a plan view of a mobile combine harvester in accordance with the invention.

The mobile combine harvester in accordance with the present invention shown by way of example in the drawings comprises a reaping assembly 1, a thrashing assembly 2, a cleaning assembly 3 and a grain handling assembly 4.

The reaping assembly comprises a platform 10 which extends horizontally in a direction transverse to the direction of the combine and which slopes downwardly in a rearward direction. At the front edge of the platform 10 there is provided a cutter bar 11 which may be of the reciprocating sickle type customarily used for mowing machines and harvesters. Above the cutter bar there is mounted a rotatable reel 12 having four cross bars 12a carrying steel wire teeth. The reel 12 is rotated in a clockwise direction as viewed in FIG. 2 so as to thrust the cut stems of the grain rearwardly onto the platform 10 and prevent their being lost in the field. At the rear of the platform 10 there is provided a rotary helicoidal conveyor 13 comprising helical vanes 14 on a cylinder 15. The helicoidal conveyor is rotated in a clockwise direction as viewed in FIG. 2. As seen in FIG. 1, the vanes 14 on a major portion of the cylinder 15 are arranged to move the cut stems toward the right (with reference to the forward direction of movement of the combine) while the vanes on a relatively short right-hand portion of the cylinder 15 are arranged to move the cut grain toward the left. The cut grain is thereby delivered to the forward end of the thrashing assembly 2 which is connected to the reaping assembly 1 near the right-hand end. The platform 10 may for example have a free span of 2.7 m and is preferably arranged so that it can be raised or lowered so as to cut the standing grain at the desired height.

The thrashing assembly 2 comprises a cylindrical casing 20 which as seen in FIG. 2 is inclined upwardly in a rearward direction. The lower front end is connected with the reaping assembly 1 at the location of which the cut grain is delivered by the conveyor 13. A longitudinally extending rotor 21 is rotatable in the casing 20. The rotor 21 comprises a cylindrical portion 22 on which there is a helically extending vane 23 carrying at its periphery pins or projections 24 (only a few of which are shown in the drawings) which assist in thrashing the grain to separate kernels from the chaff and straw. At the rear end of the rotor 21 there is a radial fan 25 which is coaxial with the rotor and which rotates in a direction to drawn air rearwardly through the casing 20 and to discharge the air and straw carried thereby through a discharge orifice 26 which is directed laterally and downwardly so as to scatter the straw back onto the field. Surrounding the rotor 21 there is a cylindrical screen 27 having apertures of such size that the grain kernels can pass through it while the straw does not. The screen 27 may be stationary or be rotated relative to the rotor 10 for example in the opposite direction.

A lower portion of the casing 20 is of oval cross section so as to provide a trough portion 28 in which the grain having passed through the screen 27 is collected. A screw conveyor 29 is rotatable in the trough portion 28 so as to propel the grain upwardly and rearwardly through the rear end of the thrashing assembly 2 and deliver it to the cleaning assembly.

It will be noted that the lower forward end of the casing 20 of the thrashing assembly 2 is connected directly to the reaping assembly so as to receive the cut grain directly without any intervening conveyor. The screw conveyor 13 of the reaping assembly rotates in a direction to propel the cut grain into the forward end of the thrashing assembly. Moreover, the cut grain is drawn into the thrashing assembly by the cooperation of the helical vane 23 of the rotor and the air flow produced by the radial fan 25. The construction of the combine is thereby simplified.

The rotor 21 and radial fan 25 are statically and dynamically balanced so that the combine in accordance with the invention exhibits less vibration and has a longer work life than conventional combines. Moreover, the thrashing system is more effective and achieves a higher yield. In comparison with conventional thrashing system in which the cut grain is subjected to a beating action for approximately $\frac{1}{3}$ turn in a cylinder having a diameter of 40 to 50 cm, the grain in accordance with the present invention is subjected to a beating action of at least 7 turns in a large cylinder, for example one having a diameter of 70 cm. The pins 24 on the rotor are adjustable in order to control the speed of movement of the cut grain in the thrashing assembly and the beating action.

The cleaning assembly 3 which receives the grain directly from the thrashing assembly 2 comprises a casing 30 in which there is at least one reciprocating screen 31. Two such screens are shown by way of example in FIG. 2 spaced one above the other. The grain passes through the screens while a radial fan 32 directs current of air up through the screens so as to carry off chaff and other light waste material which is discharged through an opening 33 at the rear of the casing 30. The casing 30 has a sloping bottom portion 34 in which the cleaned grain is collected. The upper screen 31 of the cleaning assembly is connected by a flexible bridge, for example of canvas or other flexible material with the thrashing assembly 2 so that the thrashed grain passes directly from the thrashing assembly to the cleaning assembly without requiring any intervening conveyor.

The grain handling assembly 4 is designed to receive the cleaned grain from the cleaning assembly 3. While the cleaned grain could if desired be stored in a bin provided on the combine or could be delivered to a truck driven alongside the combine, the grain handling assembly is illustrated by way of example as providing means for bagging the cleaned grain.

Figure 4:
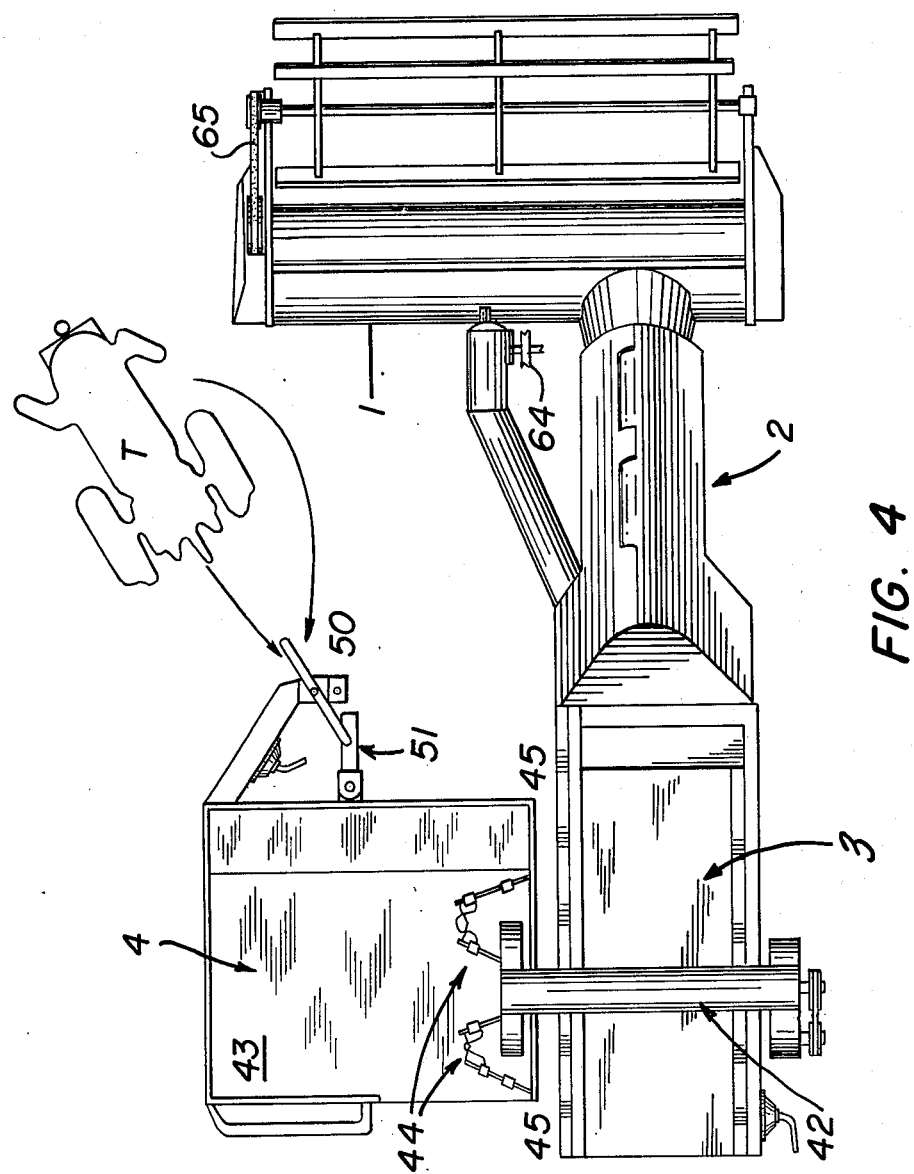
FIG. 4 is a schematic plan illustrating the coupling of the combine to a tractor.

A transversely extended screw conveyor 40 moves the cleaned grain from the sloping bottom portion 34 of the casing 30 of the cleaning assembly into the lower end of a bucket type elevator 41. At the upper end of the elevator 41 there is a second screw conveyor 42 which extends transversely across the cleaning assembly 3 to a position above an elevated platform 43 which extends laterally from the cleaning assembly 3 and spaced rearwardly from the reaping assembly 1 as seen in FIGS. 1 and 4. At the discharge end of the screw conveyor 42, there are two bagging spouts 44 provided with suitable valving devices 45 so that the grain transported by the screw conveyor 42 can be discharged selectively through one bagging spout or the other. While the bag is being filled from one spout, a filled bag can be removed and an empty bag provided for the other spout. The high productive capacity of the machine is thus accommodated by the continuous operation of the screw conveyors 40 and 42 and the elevator 41. A considerable number of bags can be accommodated on the platform 43 prior to being transferred to a truck.

The embodiment of the invention illustrated in the drawings is not self-propelled but rather is designed to be coupled with a tractor provided with a power take off for driving the several operative components of the combine. This provides for more economical operation since the cost of the combine is greatly reduced and the tractor can be used for other purposes.

As illustrated schematically in FIG. 4, a tractor T is coupled to a draw bar 50. A power take off shaft of the tractor is coupled with a cardan shaft 51 from which all of the moving components of the combine are driven. A pulley (not shown) on the cardan shaft 51 is coupled by a belt 52 with a pulley 53 on an inclined shaft 54 which is approximately in line with the screw conveyor 29 of the thrashing assembly. The shaft 54 is connected with the screw conveyor 29 by a cardan joint 55. A pulley 56 on the extended shaft of the screw conveyor 29 is coupled by a belt 57 with a pulley 58 for driving the rotor 21 of the thrashing assembly 2. If the cylindrical screen 27 of the thrashing assembly 2 is to be driven, a suitable belt drive is provided for driving it, for example in the opposite direction.

A further pulley 59 on the shaft of the screw conveyor 29 is coupled by a belt 60 with a pulley 61 on the rear end of a cardan shaft which extends through a tubular strut 62 extending from a rear portion of the thrashing assembly 2 to approximately the central portion of the reaping assembly 1 as seen in FIGS. 1 and 4. Means is provided for coupling the forward end of the cardan shaft with the conveyor 13 of the reaping assembly, for example by bevel gears driving a laterally projecting shaft 63 on which there is provided a pulley 64 coupled by a belt (not shown) with the conveyor 13. A belt 65 at the outboard end of the conveyor 13 drives the reel 12. Moreover, a drive (not shown) is provided for the cutter bar 11.

The operative components of the cleaning assembly 3 and of the grain handling assembly 4 are also driven from the cardan shaft 51 which is connected with the power take off of the tractor. As the drive of these components is in a conventional manner, it is only partially shown in the drawings. Thus the radial fan 32 is driven by a belt 66 from a pulley 67 which is coupled with the cardan shaft 51. The lower transverse screw conveyor 40 and the elevator 41 are driven in like manner from another pulley on the same shaft with pulley 67. A belt 68 running on a pulley at the upper end of the elevator 41 drives the upper transverse screw conveyor 42. The screens 31 of the cleaning assembly 3 are conveniently driven by eccentric cam (not shown) on the same transverse shaft that carries the pulley 67.

Thus all operative components of the combine are driven from the cardan shaft 51 coupled to the power take off of the tractor so that no prime mover is required on the combine.

It will thus be seen that the present invention provides a relatively simple yet highly effective and efficient combine for harvesting grain. The combine can be operated by only two men one of whom drives the tractor and the other is at the bagging station.

While a preferred embodiment of the invention has been illustrated by way of example in the drawings and is herein particularly described, it will be recognized that many modifications may be made and that the invention is hence in no way limited to the illustrated embodiment.

What is claimed is:

1. A mobile combine harvester comprising:

a reaping assembly comprising a platform extending horizontally transversely of the direction of movement of said harvester, a cutter bar at the forward edge of said platform, a reel above said cutter bar and rotatable to deliver grain cut by said cutter bar to said platform, and a conveyor at the rear of said platform for conveying cut grain laterally to a delivery point, a thrashing assembly receiving cut grain directly from said delivery point of said reaping assembly and comprising a cylindrical casing which is inclined upwardly and rearwardly from said reaping assembly with a forward end connected with said reaping assembly and a rear end elevated, a cylindrical screen in said casing, a rotor rotatable in said cylindrical screen and comprising a cylindrical portion and a continuous vane extending helically around said cylindrical portion and carrying thrashing projections at its periphery, a first radial fan coaxial with said rotor at its rear end for drawing air rearwardly through said casing and discharging it with straw from which grain has been separated at the rear of said casing, a longitudinally extending grain-collecting trough portion in said casing below said cylindrical screen to receive grain, and a screw conveyor in said trough portion for moving said grain rearwardly and upwardly to the rear end of said thrashing assembly, said casing providing a discharge for said fan, a cleaning assembly receiving said grain directly from said thrashing assembly comprising a reciprocating screen, a second radial fan for blowing air up through said screen to carry off chaff or other light waste and a collecting pan below said reciprocation screen, and a grain handling assembly comprising a grain elevator and transport means for conveying grain from said collecting pan to the lower end of said grain elevator.

2. A combine harvester according to claim 1, in which said grain handling assembly comprises a raised platform above said cleaning assembly and bagging means comprising means for conveying said grain from the upper end of said elevator and delivering it into bags on said raised platform.

3. A combine harvester according to claim 2, in which said bagging means comprises two bagging devices with two bagging spouts and valving means operable to deliver grain to a bag on one spout while a filled bag is being removed and replaced by an empty bag on the other spout.

4. A combine harvester according to claim 1, in which said thrashing assembly connects said reaping assembly and said cleaning assembly and is offset laterally from the center of said reaping assembly whereby said reaping assembly extends laterally predominately to one side of said thrashing assembly, and in which said grain handling assembly extends laterally to the same side of said cleaning assembly and is spaced rearwardly of said reaping assembly.

5. A combine harvester according to claim 4, in which means is provided on a forward portion of said grain handling assembly for coupling a tractor for propelling said harvester and receiving power from a power take-off of said tractor, means being provided for transmitting said power to operative elements of said grain handling assembly, said cleaning assembly, said thrashing assembly and said reaping assembly.

6. A combine harvester according to claim 2, in which said grain handling assembly includes an elevated platform and a generally horizontal conveyor which extends from the upper end of said elevator and across said cleaning assembly to a position above said elevated platform.

7. A combine harvester according to claim 6, in which said conveyor of said grain handling assembly has two discharge outlets through which it can supply grain to either of two bags positioned on said elevated platform to receive said grain and valving means operable to direct grain alternatively to one of said outlets or the other.

8. A combine harvester according to claim 1, in which said casing of said thrashing assembly has in cross section an oval shaped lower portion which houses said screw conveyor.

9. A combine harvester according to claim 1, in which said cylindrical screen in said casing of said thrashing assembly is rotatable.

10. A combine harvester according to claim 1, in which said cleaning assembly comprises a second reciprocating screen spaced vertically from said first mentioned reciprocating screen, the upper of said screen being connected with said thrashing assembly by a flexible bridge.

* * * * *